United States Patent [19]

Cognevich, Sr. et al.

[11] Patent Number: 4,595,867
[45] Date of Patent: Jun. 17, 1986

[54] STEERING AMPLIFIER

[75] Inventors: Kenneth J. Cognevich, Sr., River Ridge; Joseph E. Robichaux, Jr., Arabi, both of La.

[73] Assignee: Engine Monitor, Inc.

[21] Appl. No.: 755,268

[22] Filed: Jul. 15, 1985

Related U.S. Application Data

[63] Continuation of Ser. No. 535,686, Sep. 26, 1983, abandoned.

[51] Int. Cl.⁴ .................. B63H 25/02; G05D 1/00
[52] U.S. Cl. .................................. 318/588; 318/632; 318/624; 114/144 RE
[58] Field of Search ............... 318/588, 594, 591, 595, 318/592, 632, 561, 565, 624, 663, 666; 114/144 RE, 144 R, 144 A; 364/432, 457; 244/192, 194, 196

[56] References Cited

U.S. PATENT DOCUMENTS

| | | | |
|---|---|---|---|
| 3,986,091 | 10/1976 | Quiogue | 318/594 |
| 4,025,839 | 5/1977 | Maury | 318/592 X |
| 4,151,519 | 4/1979 | Swygert | 318/563 X |
| 4,223,624 | 9/1980 | Iyeta | 318/588 X |
| 4,268,783 | 5/1981 | Murray | 318/565 |
| 4,275,676 | 6/1981 | Baba | 318/588 X |
| 4,374,349 | 2/1983 | Inaba | 318/561 X |
| 4,413,215 | 11/1983 | Cavil | 318/588 |

Primary Examiner—William M. Shoop, Jr.
Assistant Examiner—Patrick C. Keane
Attorney, Agent, or Firm—Pravel, Gambrell, Hewitt & Kimball

[57] ABSTRACT

Described herein is a steering amplifier for use in the steering systems of watercraft. Potentiometers are mounted within the helm unit and the feedback unit of the craft and these potentiometers are used to determine the various helm and rudder positions. Circuitry is provided to determine the difference or error between the helm position and the rudder position and to energize solenoid valves which cause the rudder to move in the appropriate direction to correct the error.

3 Claims, 9 Drawing Figures

STEERING AMPLIFIER

This is a continuation of application Ser. No. 535,686, filed Sept. 26, 1983, now abandoned.

BACKGROUND OF THE INVENTION

This invention relates to the steering system of a vessel. Particularly, it is an amplifier, composed of solid state electronic devices on a printed circuit board, which is incorporated into the vessel's steering system and provides the means whereby the directional commands from the helm unit are transmitted to the rudder.

Various earlier patents have disclosed inventions relating to the steering systems of vessels. In Spurgin, U.S. Pat. No. 4,342,274; Cavil, U.S. Pat. No. 3,739,738; and, Wesner, U.S. Pat. No. 4,055,135 means of detecting steering errors and failures were disclosed. However, the inventions disclosed by these patents did not provide for correcting the error; they only providing for signalling that an error or failure had occurred. Whereas, the present invention compares the helm position to the rudder position and causes rudder movement, if necessary, based on the result of the comparison.

A remote control apparatus for marine engines which provided an auxiliary controller located in one area of the vessel, a main controller located in the main control room and a means whereby engine control is switched from the auxiliary controller to the main controller or from the main controller to the auxiliary controller was disclosed in Inoue, U.S. Pat. No. 4,099,476.

Hirokawa, U.S. Pat. No. 3,696,282 disclosed an auto pilot system in which the set course signal and the heading signal are supplied to a comparator which feeds a servo motor through an operational device to control the ship.

But, while these inventions provide a means for transferring engine control and a means for maintaining a preset course, they do not provide primary steering means as does the present invention.

Control systems are disclosed in DeVries, U.S. Pat. No. 4,301,759 and in Tatum, U.S. Pat. No. 3,390,614. The DeVries inventions uses a plurality of control members coupled with one another and with the device to be controlled. The Tatum invention involves waveshaping circuitry for the command and response signals. Whereas, the present invention is an amplifier which takes its input from the helm and feedback potentiometers, compares the inputs, determines the proper direction for the rudder to move and outputs to the appropriate relay to energize solenoids and cause rudder movement. In addition, the present invention provides fault detection circuitry which energizes a relay whena fault is detected and light emitting diodes which illuminate to indicate which output the amplifier is energizing.

SUMMARY OF THE INVENTION

This invention is a steering amplifier for use in the steering systems of watercraft. The amplifier provides a means for signalling the rudder movement necessary for steering the craft.

The invention requires a potentiometer to be mounted within the helm unit and another potentiometer to be mounted within the feedback unit of the craft's steering system. These two potentiometers input to the steering amplifier, the helm position and the rudder position (from 0° to 40° to port and from 0° to 40° to starboard). The steering amplifier determines the difference between the helm and rudder positions and causes the rudder to move in the direction to correct the difference.

The steering amplifier provides trim pots (variable resistors) to set the rudder deadband. These trim pot settings determine how great the error must be in either the port or starboard direction before the steering amplifier will cause rudder movement.

The steering amplifier causes small rudder movement by energizing electro-hydraulic solenoid valves which control the rudder movements. If the difference between the helm and rudder position is more than 4° or 5°, the steering amplifier energizes a dual speed electro-hydraulic solenoid valve which causes greater and more rapid rudder movement in the direction required.

Fault detection circuitry is also provided. The steering amplifier contains circuitry which continuously monitors the helm and feedback potentiometer for either opened or shorted leads. Should the potentiometers or the wiring to them become shorted or opened, a relay will be energized causing a steering failure alarm to be energized. Also, a center tap is incorporated into both the helm and feedback potentiometers. These center taps provide a means whereby steering is maintained in the follow-up mode in the event of a breakage or shorting of the potentiometer leads.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE DRAWINGS

Figure 1A:
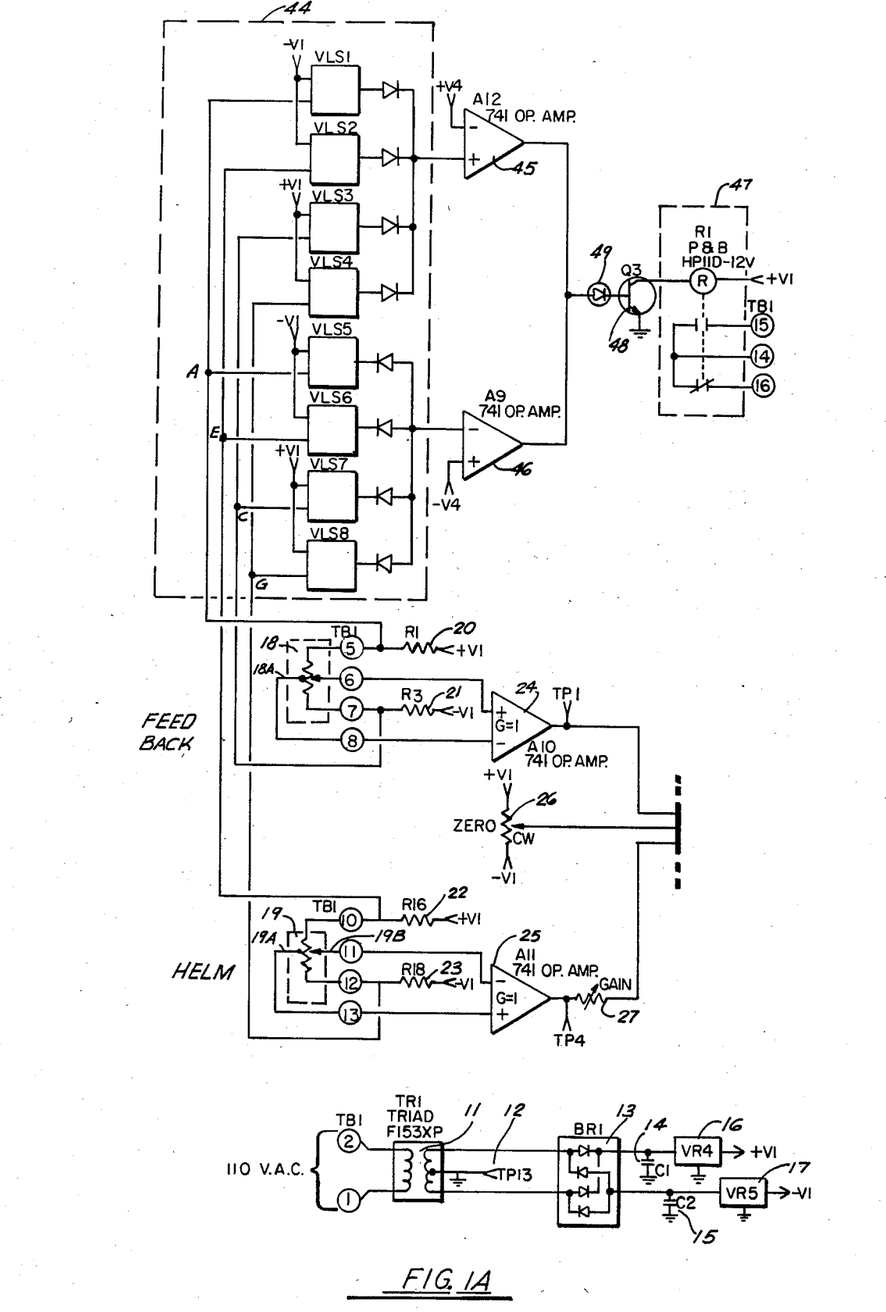
FIG. 1A is a block diagram of the steering amplifier.
Figure 1B:
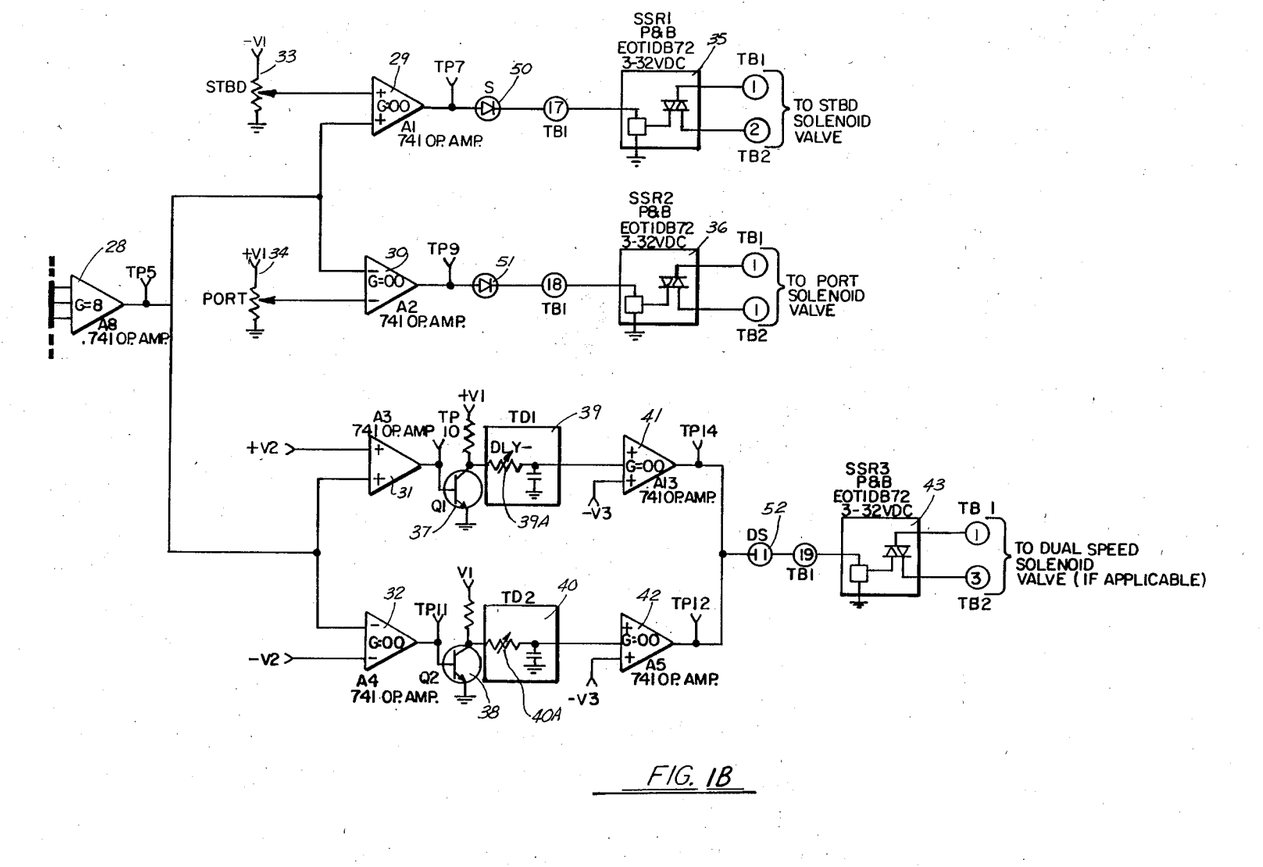
FIG. 1B is a continuation of the block diagram of the steering amplifier.

Referring to the block diagram, FIGS. 1A and 1B, 110 volts AC is brought into the circuitry on terminal block 1 (TB1), terminals 1 and 2 to the primary side of transformer 11. The secondary side of transformer 11 is connected to rectifier 13. Rectifier 13 is connected to capacitors 14 and 15, as well as voltage regulators 16 and 17. This circuitry takes the incoming 110 volts AC and steps it down, rectifies it, filters and regulates it to produce +V1 and −V1 which are used to power the op amps (operational amplifiers) in the amplifier and to provide a voltage reference for various circuits in the amplifier.

Figure 3:
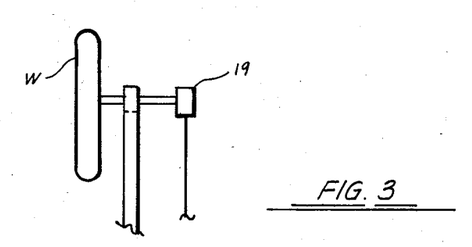
FIG. 3 is a schematic illustration of a helm unit according to the present invention.
Figure 4:
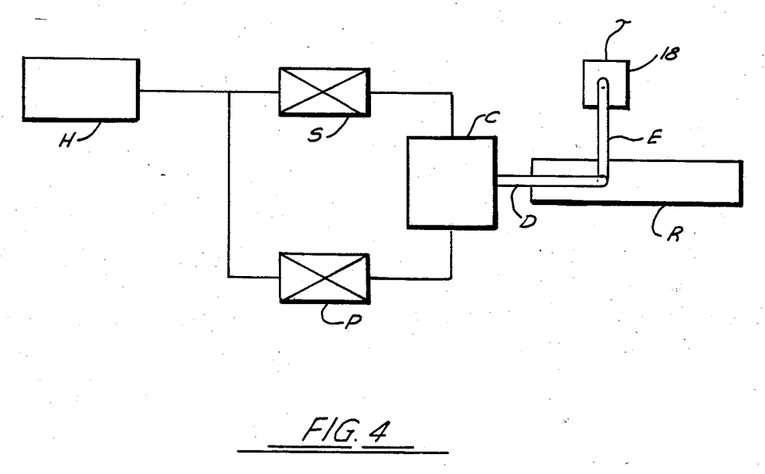
FIG. 4 is a schematic illustration of portions of a rudder control unit according to the present invention.

The feedback potentiometer 18 and the helm (or follow-up) potentiometer 19 are both powered by +V1 and −V1. The helm potentiometer 19 is connected to the helm wheel W (FIG. 3) to allow indication of the helm wheel position. The feedback potentiometer is connected to the rudder R by means of a linkage E (FIG. 4) to allow indication of the rudder position. The feedback potentiometer is powered through series resistors 20 and 21 and the helm potentiometer is powered through series resistors 22 and 23; this prevents an overload on voltage regulators 16 and 17 if either the potentiometers or the leads to them become shorted.

The center tap 18a and the wiper 18b of the feedback potentiometer 18 are connected to amplifier 24 which serves as a differential, buffer amplifier with a voltage gain of +1. The voltage output from amplifier 24, which can be measured at test point TP1, varies from 0 volts DC when the rudder is at 0°, to approximately +10 volts DC when the rudder is at 40° to starboard, and to approximately −10 volts DC when the rudder is at 40° to port.

The center tap 19a and the wiper 19b of the helm potentiometer 19 are connected to amplifier 25, which serves as a differential, buffer amplifier with a voltage gain of −1. The voltage output from amplifier 25, which can be measured at test point TP4, varies from 0 volts DC when the helm wheel or follow-up lever is at 0°, to approximately +10 volts DC when the helm wheel or follow-up lever is at 40° to port, and to approximately −10 volts DC when the helm wheel or follow-up lever is at 40° to starboard.

The outputs of amplifiers 24 and 25 are summed with each other and with the output of the zero potentiometer 26 at amplifier 28, which has a gain of −8. The output of amplifier 28 represents the difference (error) between the helm voltage and the feedback voltage multiplied by 8. This value was chosen so that the output of amplifier 28 would vary by approximately 2 volts per degree of difference between the helm position and the rudder position. The gain trim pot 27 is used as a fine adjustment to match the particular helm or follow-up lever installation to the particular feedback unit installation.

The output of amplifier 28 is connected to the inputs of four amplifiers. The first two amplifiers are 29 and 30. These amplifiers are used as comparators, that is, they compare the voltages on their inputs and switch their outputs either high or low according to which of their inputs is at the greater voltage. Amplifiers 29 and 30 compare the rudder error voltage from amplifier 28 to the voltage set on the port trim pot 34 and the starboard trim pot 33, respectively. The port 34 and starboard 33 trim pots are used to set the rudder deadband. That is, the port trim pot 34 setting determines how great the rudder error must be before the steering amplifier will cause the rudder to move in the port direction, whereas the starboard trim pot 33 setting determines how great the rudder error must be before the steering amplifier will cause the rudder to move in the starboard direction. When the error voltage from amplifier 28 is nearly zero, such that it is less in magnitude than the voltage set on the port 34 and starboard 33 trim pots, the outputs of amplifier 29 and amplifier 30 are low such that the solid state relays 35 and 36 are off.

If the rudder error position voltage from amplifier 28 should increase positively above the voltage set on the starboard trim pot 33, indicating that the rudder should move to port, the output of amplifier 29 will switch on (approximately +10 volts DC at test point TP7). When this occurs, solid state relay 35 will turn on, energizing the electro-hydraulic solenoid valve (FIG. 4) which causes the rudder to move to starboard. The hydraulic fluid source H supplies hydraulic fluid via valve S to rudder control unit C, which then appropriately moves the rudder R via linkage D. When the rudder position is again close to the helm or follow-up lever position, the output of amplifier 28 will fall (to approximately 0 volts DC or less at test point TP7) below the voltage set on the starboard trim pot 33, amplifier 29 will again turn off causing solid state relay 35 to turn off and to de-energize the electro-hydraulic solenoid valve. Thus, the rudder will stop moving to starboard.

If the rudder error position voltage from amplifier 28 should increase negatively beyond the voltage set on the port trim pot 34, indicating that the rudder should move to starboard, the output of amplifier 30 will switch on (approximately +10 volts DC at test point TP9). When this occurs, solid state relay 36 will turn on, energizing the electro-hydraulic solenoid valve (FIG. 4) which causes the rudder to move to port. When the rudder position is again close to the helm or follow-up lever position, the output of amplifier 28 will fall (to approximately 0 volts DC or less at test point TP9) below the voltage set on the port trim pot 34, amplifier 30 will again turn off, causing solid state relay 36 to turn off and to de-energize the electro-hydraulic solenoid valve. Thus, the rudder will stop moving to port.

Amplifiers 31 and 32 are also used as comparators. They compare the rudder position error voltage to V2, where V2 represents a rudder position error of about 4° or 5°. When the rudder position error is less than 4° or 5°, either to port or starboard, the output of amplifiers 31 and 32 are on (at approximately +10 volts DC at test points TP10 and TP11 respectively). This causes transistors 37 and 38 to turn on, which discharges the capacitors in the time delay components 39 and 40. This in turn, causes amplifiers 41 and 42 to turn off (approximately 0 volts DC or less at test points TP14 and TP12, respectively) and the solid state relay 43 to turn off, de-energizing the dual speed electro-hydraulic solenoid valve.

When the rudder position error exceeds 4° or 5° to starboard, the output of amplifier 28 will be more positive than V2 and amplifier 32 will turn off. This turns transistor 38 off which allows the capacitor in time delay component 40 to begin charging up to V1. When the charge on the capacitor in time delay component 40 exceeds V3, the output of amplifier 42 will turn on, which in turn will cause solid state relay 43 to turn on and energize the dual speed electro-hydraulic servo valve.

When the rudder position error exceeds 4° or 5° to port, the output of amplifier 28 will be more negative than −V2 and amplifier 31 will turn off. This turns transistor 37 off which allows the capacitor in time delay component 39 to begin charging up to V1. When the charge on the capacitor in time delay component 39 exceeds V3, the output of amplifier 41 will turn on which in turn will cause solid state relay 43 to turn on and energize the dual speed electro-hydraulic servo valve.

The rate at which the capacitors in time delay components 39 and 40 charge, and thus the time delay which they introduce in the energizing of solid state relay 43 is adjustable by means of trim pots 39a for port and 40a for starboard.

The fault detection circuitry which monitors the condition of the helm or follow-up lever potentiometer and the feedback potentiometer consists of the voltage level shifting, passive networks 44 (VLS 1 through VLS 8), amplifiers 45 and 46 and relay 47. Amplifiers 45 and 46 are used as comparators. They compare their inputs, the (+) input on amplifier 45 and the (−) input on amplifier 46, to the reference voltage V4. When the voltage on the (+) input of amplifier 45 and the voltage on the (−) input of amplifier 46 are near zero (which is the case when the voltages at "A", "E", "C", and "G" are near their proper values), the outputs of amplifiers 45 and 46 are off, that is, they are at 0 volts DC or lower and therefore relay 47 is de-energized.

The voltage level shifters 44 use a passive network to shift the voltage on a particular input by 10 volts DC. Thus, when each input, "A", "E", "C", and "G" is near its proper value, the output of each voltage level shifter is near 0 volts DC. However, should either the helm (or follow-up lever) potentiometer or the feedback potentiometer or one of the leads to either potentiometer short or open, the voltage at one of the connections to the potentiometers will change to 0 volts DC (or lower) in the case of a short or to 15 volts DC, in the case of an open, which will cause the input of the corresponding voltage level shifter to change by the same amount. Since the output of the voltage level shifter will also change by a proportional amount, the input to either amplifier 45 or 46 will change by an amount greater than V4 which will cause the output of either amplifier 45 or 46 to turn on energizing relay 47.

The feedback unit will fail if one or more of the leads to or within the unit either break or short together. Also, failure will occur when the feedback unit is filled with saltwater, forming a short circuit. Since failure of the feedback unit is a major cause of steering failure, the steering amplifier contains a failure detection circuit which continuously monitors the voltage at the clockwise and counterclockwise end of the feedback pot 18 mounted within the feedback unit, and when the voltage at either or both ends of the feedback pot deviates from its prescribed value, the steering amplifier causes the steering failure alarm to be sounded.

The steering amplifier also contains circuitry which detects similar failures in the helm pot 19, although their occurrence is much less frequent, and also sounds the steering failure alarm should the helm pot 19 or the wiring to it either become shorted or opened.

The system also incorporates a feature whereby a center tap is incorporated into both the potentiometer mounted within the feedback unit and the potentiometer mounted within the helm unit. This feature provides a means whereby steering control is maintained in the follow-up mode in the event of the breakage or shorting together of the leads to the potentiometers referenced above.

Because of this feature, when one of the leads to the feedback or helm potentiometers 18 or 19 opens or shorts to one of the other leads, neither the rudder command signal nor the rudder feedback signal is totally lost and in the case of an opened or shorted lead to the feedback potentiometer 18, the system will steer in the follow-up mode as though it were actually in the non-follow-up mode thus giving the helmsman the capability to steer the vessel until he has time to determine the best course of action in response to the failure.

Refer to the schematic diagram for a description of the amplifier. Beginning on FIG. 2B, 10 volts AC is brought into the circuitry on terminal block 1 at terminals 1 and 2. The 110 volt AC is connected to the primary side of transformer 11 and the secondary side of transformer 11 is connected to bridge rectifier 13. Rectifier 13 is connected to one side of capacitors 14 and 111 as well as to pin 1 of regulator 16. Pin 2 of regulator 16 is connected to one side of capacitors 112 and 114 and to one side of diode 113. Pin 3 of regulator 16 and the other side of capacitors 14, 111, 112 and 114 as well as the other side of diode 113 are connected to ground. Rectifier 13 is also connected to one side of capacitor 15 and to pin 3 of regulator 17. Pin 2 of regulator 17 is connected to one side of capacitors 115 and 116. Pin 1 of regulator 17 and the other sides of capacitors 15, 115 and 116 are connected to ground.

Figure 2A:
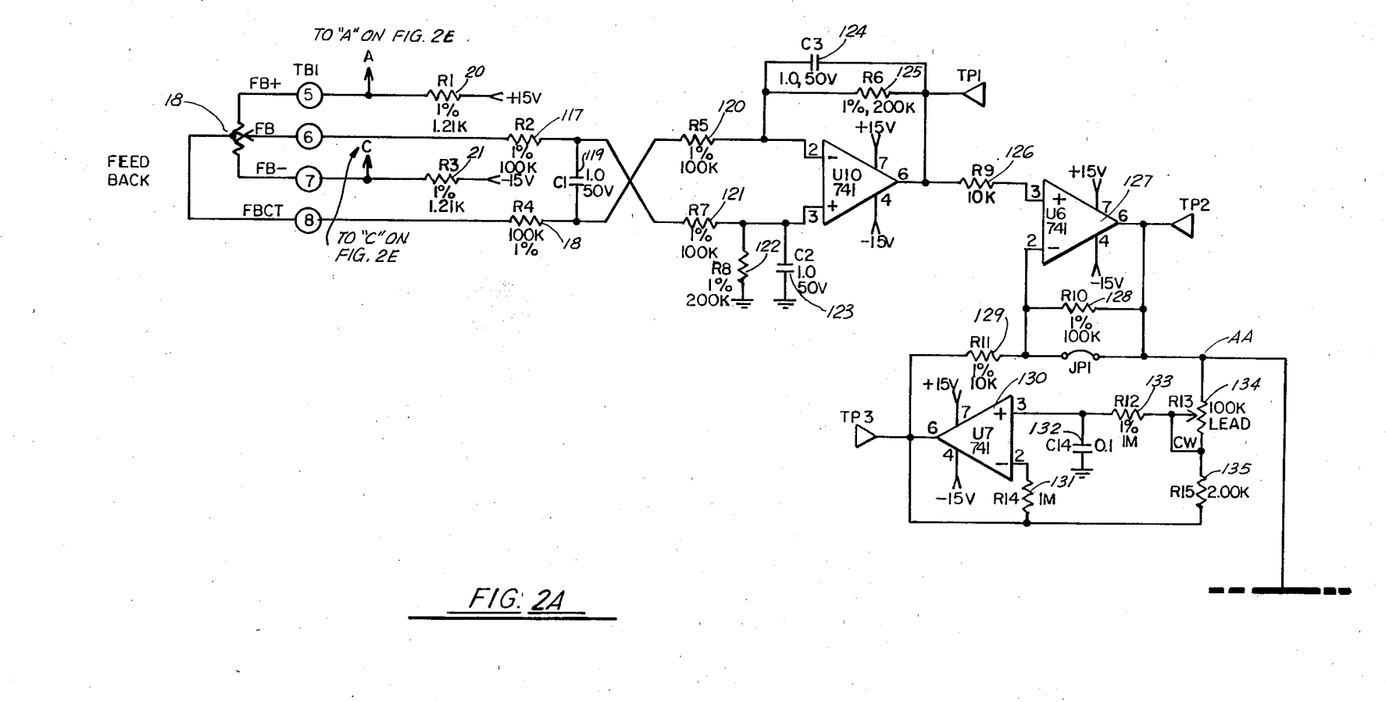
FIG. 2A is a schematic diagram of the steering amplifier.

Refer now to FIG. 2A. The feedback potentiometer is connected to terminal block 1 at terminals 5, 6, 7 and 8. The positive side of the feedback potentiometer is connected through resistor 20 to +15 volts and the negative side is connected through resistor 21 to −15 volts. The variable lead of the feedback potentiometer is connected to resistor 117 and the center tap is connected to resistor 118. The other side of resistor 117 is connected to capacitor 119 and resistor 121. The other side of resistor 118 is connected to capacitor 119 and resistor 120. Resistor 120 is also connected to pin 2 of amplifier 24, resistor 125 and capacitor 124. The other sides of capacitor 124 and resistor 125 are connected to pin 6 of amplifier 24. Resistor 121 is connected to pin 3 of amplifier 24, and one side of resistor 122 and capacitor 123. The other side of resistor 122 and capacitor 123 is connected to ground. Pin 6, the output of amplifier 24 is connected through resistor 126 to pin 3 of amplifier 127. Resistor 128 is connected between pins 2 and 6 of amplifier 127. Pin 2 of amplifier 127 is also connected to resistor 129 and to one side of a jumper; the other side of the jumper is connected to terminal 6 of amplifier 127 and to point or node AA. Pin 6 of amplifier 30 is connected to resistors 129, 131, and 135. Resistor 131 is also connected to pin 2 of amplifier 130. Pin 3 of amplifier 130 is connected to capacitor 132 and resistor 133. Variable resistor 134 is connected to resistor 133 and 135 and to node AA.

Figure 2B:
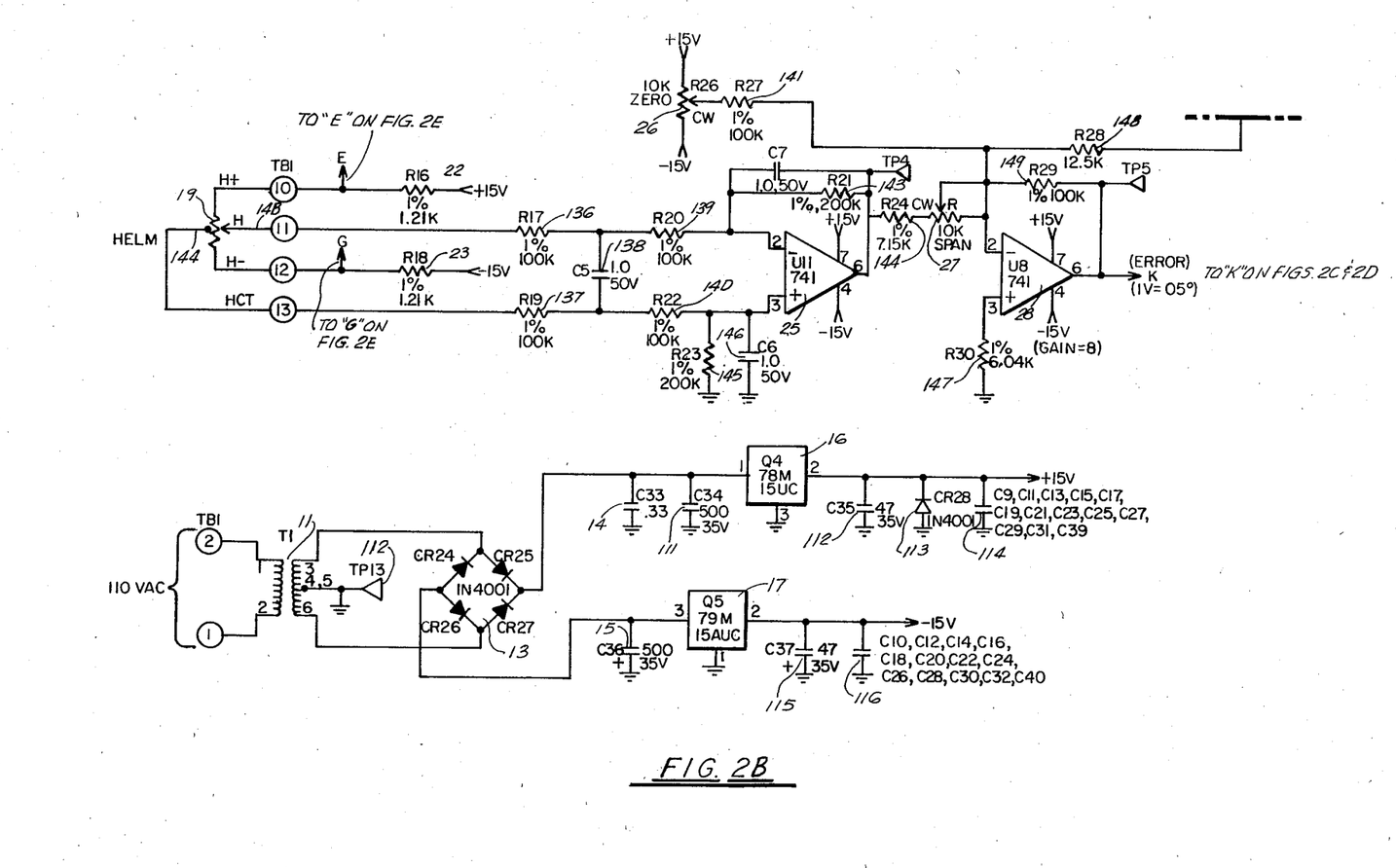
FIG. 2B is a continuation of the schematic of the steering amplifier.

Refer to FIG. 2B. The helm potentiometer 19 is connected to terminal block 1 at terminals 10, 11, 12 and 13. The positive side of the helm potentiometer is connected through resistor 22 to +15 volts and the negative side is connected through resistor 23 to −15 volts. The variable lead of the helm potentiometer is connected to resistor 136 and the center tap is connected to resistor 137. The other side of resistor 136 is connected to capacitor 138 and resistor 139. The other side of resistor 137 is connected to capacitor 138 and resistor 140. Resistor 139 is also connected to pin 2 of amplifier 28. Capacitor 142 and resistor 143 are connected between pins 2 and 6 on amplifier 25. The other side of resistor 140 is connected to resistor 145, capacitor 146 and pin 3 of amplifier 25. Resistor 145 and capacitor 146 are also connected to ground. Pin 6, the output of amplifier 25, is connected through resistor 144 and the gain trim pot 27 to the negative input, pin 2, of amplifier 28. Resistor 149 is connected between pins 2 and 6 of amplifier 28. Resistor 147 is connected between pin 3 of amplifier 28 and ground. The output from pin 6 of amplifier 28 is designated "K" and is the rudder error voltage, used in the portions of the circuitry shown in FIGS. 2C and 2D. The zero potentiometer is connected through resistor 141 to a point or node common to resistors 148, 149, the gain trim pot 27 and pin 2 of amplifier 28. The other side of resistor 148 is connected to node AA on FIG. 2A.

Figure 2C:
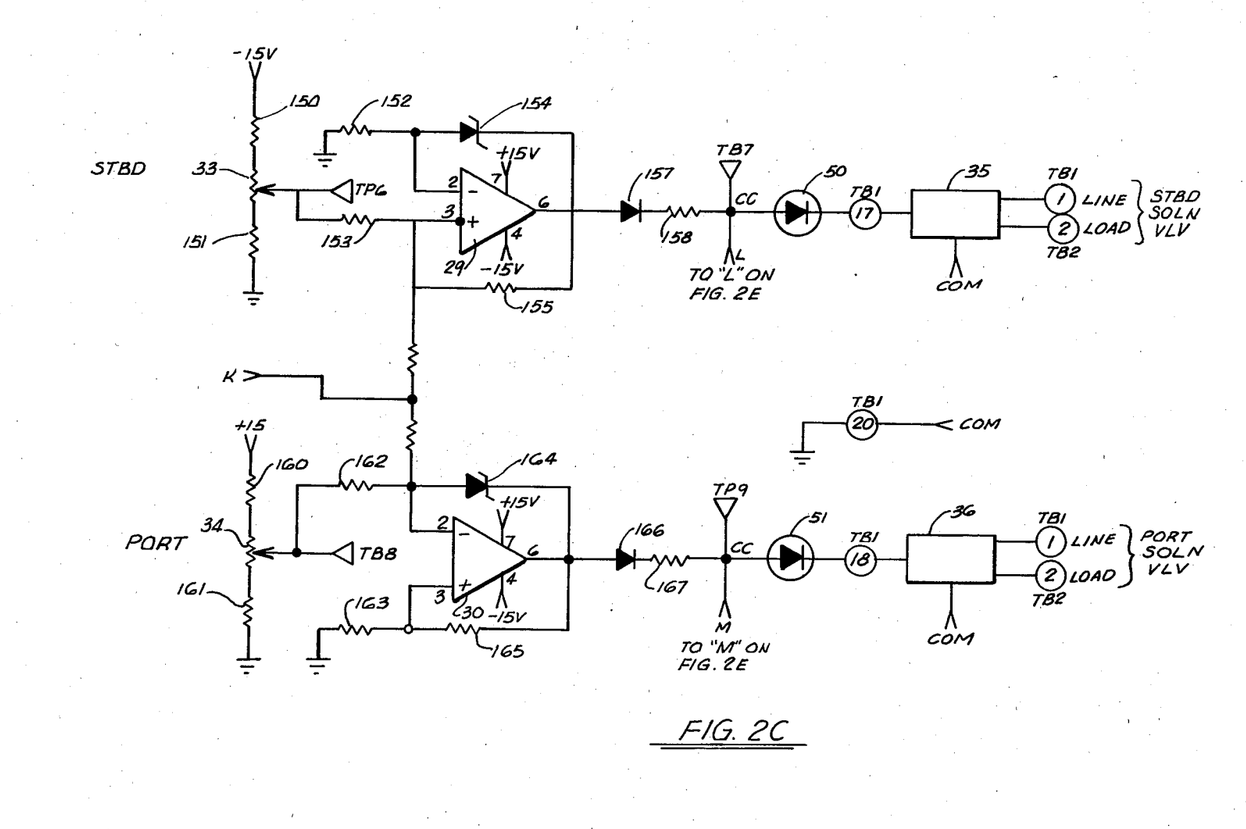
FIG. 2C is a continuation of the schematic of the steering amplifier.

Refer to FIG. 2C. The starboard trim pot 33, is connected between resistors 150 and 151 and through resistor 153 to pin 3 of amplifier 29. The other side of resistor 150 is connected to negative 15 volts and the other side of resistor 151 is connected to ground. Resistor 152 is connected to ground and to a point common to pin 2 of amplifier 29 and zener diode 154. The other side of diode 154 is connected a point common to pin 6 of amplifier 29, resistor 155 and diode 157. Also connected to pin 3 of amplifier 29 are resistors 155 and 156. Diode 157 is connected through resistor 158 to a point CC which is common to light emitting diode 50 and "L" which goes to the collector of transistor 51 on FIG. 2E. Light emitting diode 50 is connected to terminal block 1 at terminal 17, which is connected to relay 35, the relay which activates the starboard solenoid valve.

The rudder error voltage "K" from FIG. 2B is connected to point BB which is between resistors 156 and 159.

The port trim pot 34, is connected between resistors 160 and 161 and through resistor 162 to pin 2 of amplifier 30. The other side of resistor 160 is connected to positive 5 volts and the other side of resistor 161 is connected to ground. Resistor 162 is also connected to a point common to resistor 159, zener diode 164 and pin 2 of amplifier 30. The other side of diode 164 is connected to pin 6 of amplifier 30 and diode 166. Resistor 165 is connected between pins 3 and 6 of amplifier 30. Resistor 163 is connected between pin 3 of amplifier 30 and ground. Diode 166 is connected through resistor 167 to point DD which is common to light emitting diode 50 and "M" which goes to the collector of transistor 52 on FIG. 2E. Light emitting diode 51 is connected to terminal block 1 at terminal 18 which is connected to relay 36, the relay which activates the port solenoid valve.

Figure 2D:
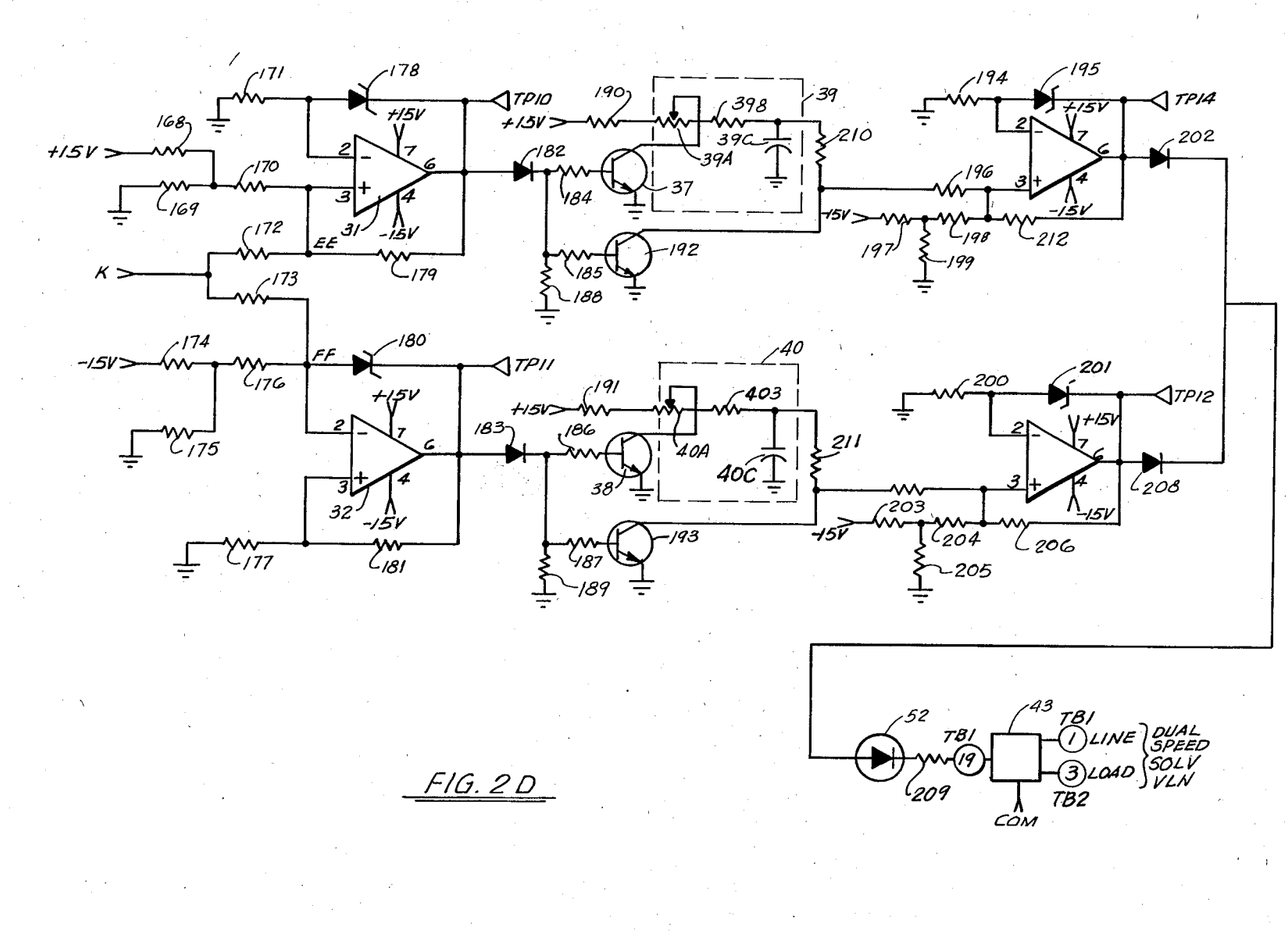
FIG. 2D is a continuation of the schematic of the steering amplifier.

Refer to FIG. 2D. The rudder error voltage "K" is brought through resistor 172 to point EE and through resistor 173 to point FF. Point EE is the common point between resistors 170, 172, 179 and pin 3 of amplifier 31. Point FF is the common point between resistors 173 and 176, zener diode 180 and pin 2 of amplifier 32. Positive 15 volts is connected to pin 3 of amplifier 31 through the resistor network composed of resistors 168, 169 and 170. Negative 15 volts is connected to pin 2 of amplifier 32 through the resistor network composed of resistors 174, 175 and 176. Resistor 171 is connected between pin 2 of amplifier 31 and ground. Zener diode 178 is connected between pins 2 and 6 and resistor 179 is connected between pins 3 and 6 of amplifier 31. Resistor 177 is connected between pin 3 of amplifier 32 and ground. Zener diode 180 is connected between pins 2 and 6 and resistor 181 is connected between pins 3 and 6 of amplifier 32.

Diode 182 is connected to pin 6 of amplifier 31 and resistors 184, 185 and 188. Diode 183 is connected to pin 6 of amplifier 32 and resistors 186, 187 and 189. Resistor 184 is connected to the base of transistor 37; the collector of transistor 37 is connected to variable resistor 39a and resistor 39b and the emitter of transistor 37 is connected to ground. Resistor 185 is connected to the base of transistor 192; the collector of transistor 192 is connected to resistors 196 and 210 and the emitter is connected to ground. Resistor 190 is connected to positive 15 volts and the delay (−) circuit composed of variable resistor 39a, resistor 39b and capacitor 39c. Resistor 210 is connected to the delay (−) and resistor 196. Resistor 186 is connected to be base of transistor 38; the collector of transistor 38 is connected to variable resistor 40a and resistor 40b and the emitter of transistor 38 is connected to ground. Resistor 187 is connected to the base of transistor 193; the collector of transistor 193 is connected to resistors 202 and 211 and the emitter is connected to ground.

−15 volts is connected to pin 3 of amplifier 41 through the resistor network composed of resistors 197, 198 and 199. −15 volts is connected to pin 3 of amplifier 42 through the resistor network composed of resistors 203, 204 and 205. Resistor 194 is connected between pin 2 of amplifier 41 and ground. Resistor 196 is connected to pin 3 of amplifier 41 and zener diode 195 is connected between pins 2 and 6. Resistor 212 is connected between pins 3 and 6 of amplifier 41. Diode 207 is connected to pin 6 of amplifier 41 and to light emitting diode 52. Resistor 200 is connected between pin 2 of amplifier 42 and ground. Resistor 202 is connected to pin 3 of amplifier 42 and zener diode 201 is connected between pins 2 and 6. Resistor 206 is connected between pins 3 and 6 at amplifier 42. Diode 208 is connected to pin 6 of amplifier 42 and to light emitting diode 52. Light emitting diode 52 is connected to terminal block 1 at terminal 19, through resistor 209, which is connected to relay 43, the relay which activates the dual speed solenoid valve.

Figure 2E:
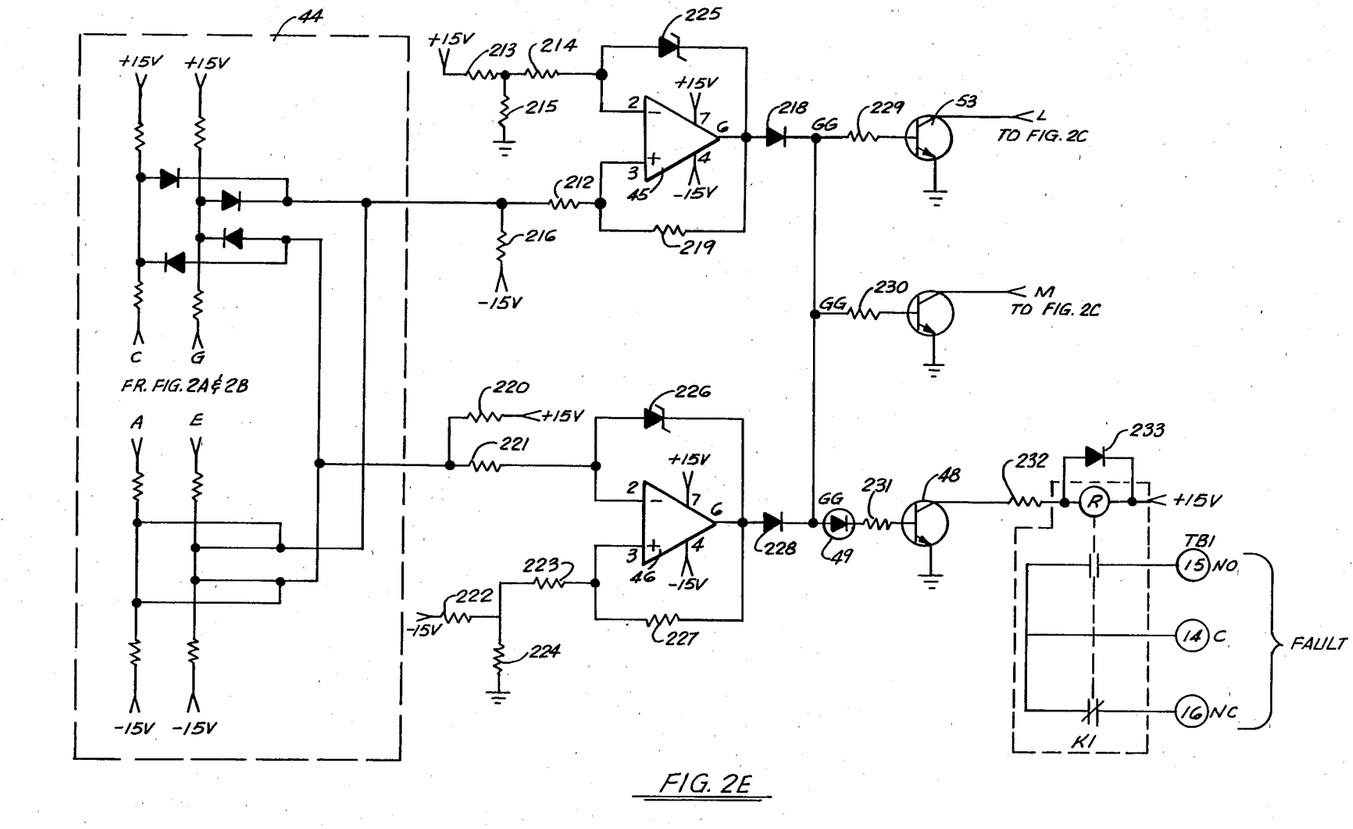
FIG. 2E is a continuation of the schematic of the steering amplifier.

Refer now to FIG. 2E for discussion of the fault detection circuitry. Voltage shifting networks 44, composed of diodes and resistors, are connected to pin 3 of amplifier 45 through the resistor network composed of resistors 212 and 216 and to pin 2 of amplifier 46 through the resistor network composed of resistors 220 and 221. +15 volts is connected to pin 2 of amplifier 45 through the resistor network composed of resistors 213, 214 and 215. −15 volts is connected to pin 3 of amplifier 46 through the resistor network composed of resistors 222, 223 and 224. Zener diode 225 is connected between pins 2 and 6 of amplifier 45 and resistor 219 is connected between pins 3 and 6. Diode 218 is connected between pin 6 of amplifier 45 and point GG. Zener diode 226 is connected between pins 2 and 6 of amplifier 46 and resistor 227 is connected between pins 3 and 6. Diode 228 is connected between pin 6 of amplifier 46 and point GG. Point GG is connected to the base of transistor 53 through resistor 229 and to the base of transistor 54 through resistor 230. Point GG is also connected to light emitting diode 49. Light emitting diode 49 is also connected to the base of transistor 48, through resistor 231. The emitter of transistor 48 is connected to resistor 232. Resistor 232 is connected to relay 47 with diode 233 connected across the coil of relay 47.

Because many varying and different embodiments may be made within the scope of the inventive concept herein taught, and because many modifications may be made in the embodiments herein detailed in accordance with the descriptive requirement of the law, it is to be understood that the details hereIn are to be interpreted as illustrative and not in a limiting sense.

What is claimed as invention is:

1. A steering amplifier for a vessel having a helm, a rudder and a rudder positioning means, comprising:
   a helm potentiometer to indicate the helm position;
   a feedback potentiometer to indicate the rudder position;
   means for determining the difference between the helm potentiometer position and the feedback potentiometer position and producing a signal indicative thereof;

means for controlling the rudder positioning means in response to the difference signal;

means responsive to an open or short circuit condition in the helm potentiometer for indicating an ahead position for the helm control to the difference means; and means responsive to an open or short circuit condition in the feedback potentiometer for indicating an ahead position for the rudder to the difference means.

2. The amplifier of claim 1, wherein the helm control and the feedback potentiometer have center taps.

3. The amplifier of claim 2, wherein the open or short circuit means comprise differential amplifiers with the first differential input connected to the respective potentiometer wiper and the second differential input connected to the respective potentiometer center tap.

* * * * *